(12) United States Patent
Portela et al.

(10) Patent No.: US 11,166,439 B2
(45) Date of Patent: Nov. 9, 2021

(54) PLATFORM FLOOR SUPPORT FOR POULTRY NESTING SYSTEM

(71) Applicant: The GSI Group LLC, Assumption, IL (US)

(72) Inventors: Rudolf Giovani Portela, Marau (BR); Marcio S. Oliveira, Marau (BR)

(73) Assignee: The GSI Group, LLC, Assumption, IL (US)

( * ) Notice: Subject to any disclaimer, the term of this patent is extended or adjusted under 35 U.S.C. 154(b) by 0 days.

(21) Appl. No.: 17/254,271

(22) PCT Filed: Jun. 17, 2019

(86) PCT No.: PCT/IB2019/055018
§ 371 (c)(1),
(2) Date: Dec. 19, 2020

(87) PCT Pub. No.: WO2019/243981
PCT Pub. Date: Dec. 26, 2019

(65) Prior Publication Data
US 2021/0259214 A1      Aug. 26, 2021

(30) Foreign Application Priority Data

Jun. 19, 2018  (GB) ..................................... 1809996

(51) Int. Cl.
*A01K 31/12*     (2006.01)
*A01K 31/18*     (2006.01)

(52) U.S. Cl.
CPC .............. *A01K 31/12* (2013.01); *A01K 31/18* (2013.01)

(58) Field of Classification Search
CPC ........ A01K 31/12; A01K 31/14; A01K 31/16; A01K 31/18
See application file for complete search history.

(56) References Cited

U.S. PATENT DOCUMENTS 2,236,593 A * 4/1941 Booth .................... A01K 31/14
                                                        119/431
2,279,147 A * 4/1942 Stimson ................. A01K 31/16
                                                        119/336
(Continued)

FOREIGN PATENT DOCUMENTS

CN      202551877 U      11/2012
CN      203167798 U       9/2013
(Continued)

OTHER PUBLICATIONS

UK Intellectual Property Office, Search Report for related UK Application No. GB1809996.0, dated Dec. 12, 2018.
(Continued)

*Primary Examiner* — Monica L Barlow
*Assistant Examiner* — Aaron M Rodziwicz

(57) ABSTRACT

A poultry nesting system has a nest house with an adjacent platform raised above the surface of the surrounding substrate. The platform has an upper surface and at least a portion of a perimeter of the platform comprises a wire mesh covering a space between the substrate and the upper surface. The wire mesh is formed by a plurality of strands including an upper strand and a lower strand. At least a portion of the upper surface of the platform is supported by a plurality of platform floor supports positioned on a perimeter of the platform. Each of the plurality of platform floor supports includes a bracing member, an upper cap on an upper end of the bracing member and a lower cap on a lower end of the bracing member. The upper cap has an attachment mechanism on an upper portion thereof configured to interact with the upper surface to lock the platform floor support to the upper surface of the platform such that the platform floor support supports the upper surface in its raised position above the substrate. The upper cap has an upper catch configured to interact with the wire mesh and hold the wire (Continued)

mesh in place, wherein the upper catch forms an upward-facing valley for receiving the upper strand. The lower cap has a lower catch configured to interact with the wire mesh and hold the wire mesh in place, wherein the lower catch forms a downward-facing arch for receiving the lower strand. A length of a travel space under the downward-facing arch of the lower catch is greater that a length of a travel space in the upward-facing valley of the upper catch.

4 Claims, 5 Drawing Sheets

(56) References Cited

U.S. PATENT DOCUMENTS

| | | | |
|---|---|---|---|
| 4,364,332 A | 12/1982 | Smith | |
| 5,143,021 A * | 9/1992 | Shaley | A01K 31/10 119/330 |
| 5,626,097 A * | 5/1997 | Mast | A01K 31/16 119/339 |
| 5,813,365 A | 9/1998 | Helmy | |
| 5,957,088 A | 9/1999 | Knott et al. | |
| 2018/0213751 A1 * | 8/2018 | Baranes | A01K 31/18 |
| 2019/0116765 A1 * | 4/2019 | Teunissen | A01K 31/12 |
| 2020/0260695 A1 * | 8/2020 | Rosales | A01K 31/16 |
| 2021/0137080 A1 * | 5/2021 | Meter | A01K 41/00 |

FOREIGN PATENT DOCUMENTS

| | | | |
|---|---|---|---|
| CN | 207135919 U | 3/2018 | |
| CN | 207707039 U | 8/2018 | |
| DE | 102015116966 B3 * | 1/2017 | A01K 31/005 |
| DE | 202017102141 U1 * | 7/2018 | A01K 31/16 |
| EP | 0 842 601 A2 | 5/1998 | |
| EP | 2 829 745 A1 | 1/2015 | |
| EP | 2 907 381 A1 | 8/2015 | |
| WO | WO-2016062701 A * | 4/2016 | A01K 31/17 |
| WO | WO-2018140838 A1 * | 8/2018 | A01K 31/06 |

OTHER PUBLICATIONS

European Patent Office, International Search Report for related International Application No. PCT/IB2019/055018, dated Oct. 21, 2019.

* cited by examiner

PLATFORM FLOOR SUPPORT FOR POULTRY NESTING SYSTEM

BACKGROUND OF THE INVENTION

Field of Invention

This invention relates to nesting systems used to house poultry, and more particularly to a raised platform floor support for a nesting system.

Description of Related Art

An important concern of poultry nesting systems is to maintain healthy productive birds and produce clean eggs that are free of cracks and bacteria. This includes providing a habitat with an open profile so that necessary ventilation may be supplied. It is also necessary to provide access various areas of the nesting system for cleaning and disinfecting in order to maintain proper cleanliness.

It is the aim of the present invention to provide a durable nesting system that can be easily disassembled for thorough cleaning.

OVERVIEW OF THE INVENTION

In one embodiment, the invention is directed to a poultry nesting system having a nest house with an adjacent platform raised above the surface of the surrounding substrate. The platform has an upper surface and at least a portion of a perimeter of the platform comprises a wire mesh covering a space between the substrate and the upper surface. The wire mesh is formed by a plurality of strands including an upper strand and a lower strand. At least a portion of the upper surface of the platform is supported by a plurality of platform floor supports positioned on a perimeter of the platform. Each of the plurality of platform floor supports includes a bracing member, an upper cap on an upper end of the bracing member and a lower cap on a lower end of the bracing member. The upper cap has an attachment mechanism on an upper portion thereof configured to interact with the upper surface to lock the platform floor support to the upper surface of the platform such that the platform floor support supports the upper surface in its raised position above the substrate. The upper cap has an upper catch configured to interact with the wire mesh and hold the wire mesh in place, wherein the upper catch forms an upward-facing valley for receiving the upper strand. The lower cap has a lower catch configured to interact with the wire mesh and hold the wire mesh in place, wherein the lower catch forms a downward-facing arch for receiving the lower strand. A length of a travel space under the downward-facing arch of the lower catch is greater that a length of a travel space in the upward-facing valley of the upper catch.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
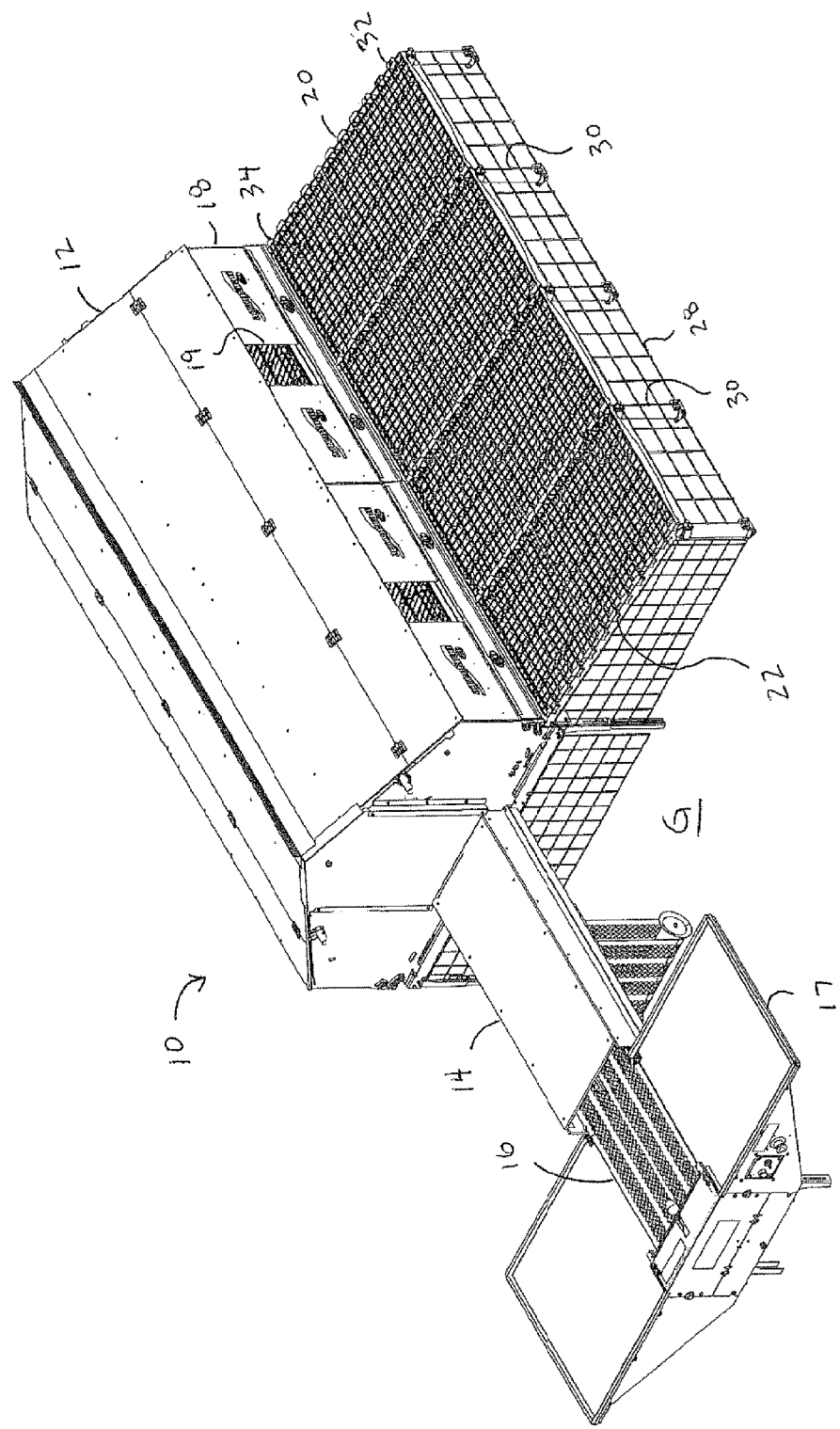
FIG. 1 is a perspective view of a poultry nesting system having a platform supported by a platform leg according to an embodiment of the present invention.

Referring to FIG. 1, a poultry nesting system 10 having a nest house 12 is shown. The interior of the nest house 12 provides nesting boxes (not shown) that collect eggs and move the eggs to a center-isle egg collection system 14. The egg collection system 14 may include a suitable conveyor system 16 for transporting eggs to an egg collection table 17. Nesting boxes and egg collection systems are well known in the art and need to be discussed herein in further detail.

Figure 2:
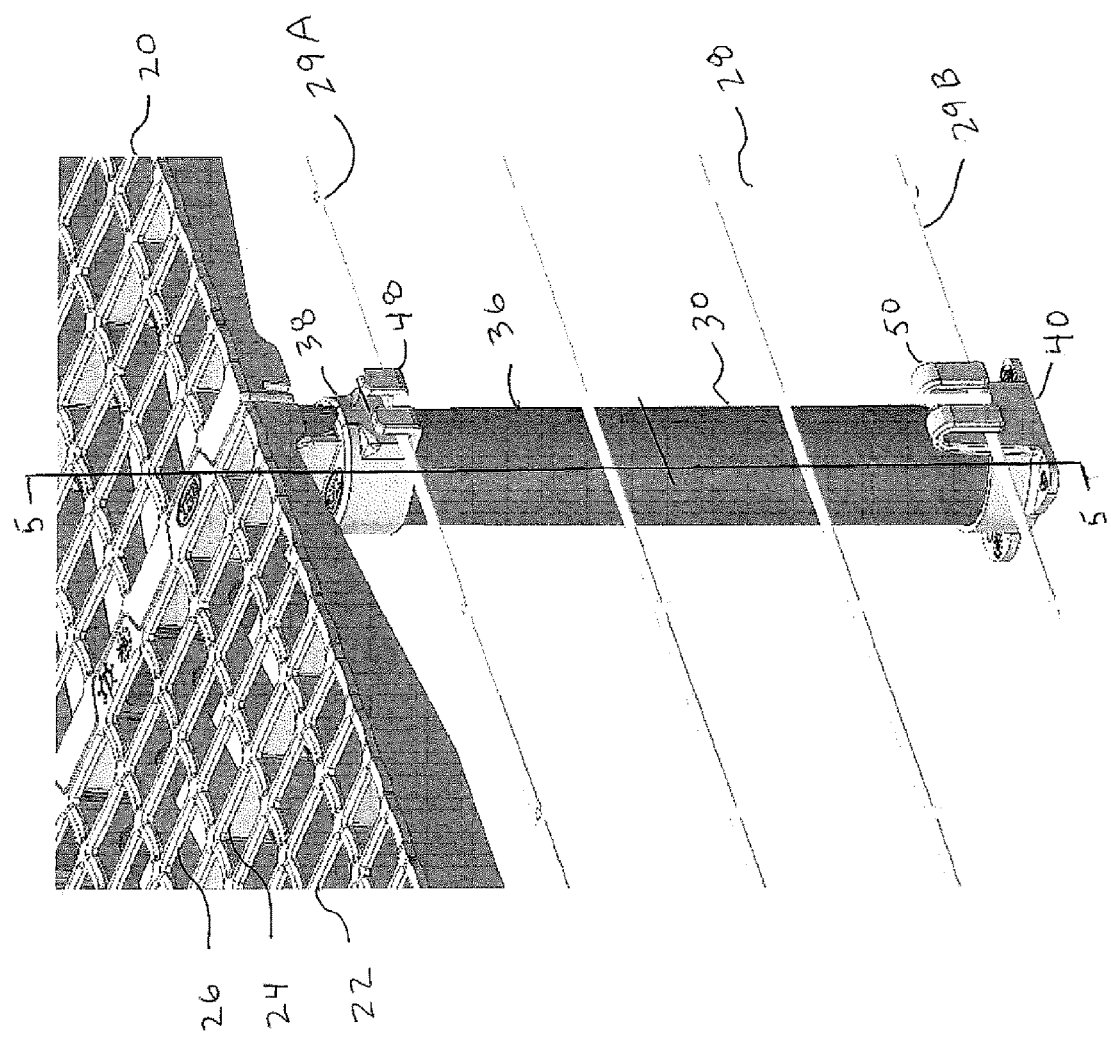
FIG. 2 is a perspective view of a portion of the platform and supporting platform leg.
Figure 3:
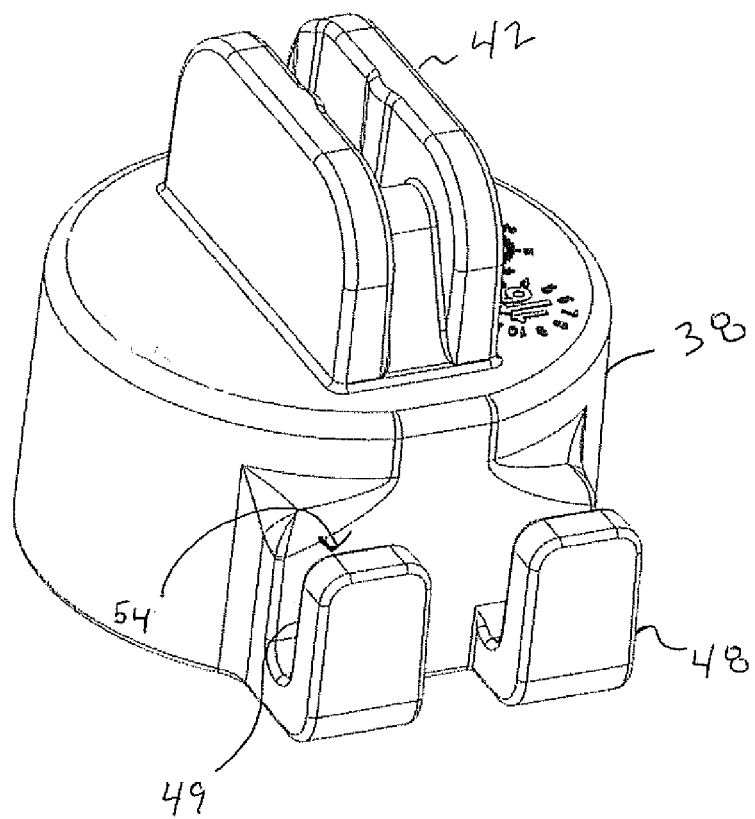
FIG. 3 is a perspective view of a top cap of the platform leg.
Figure 4:
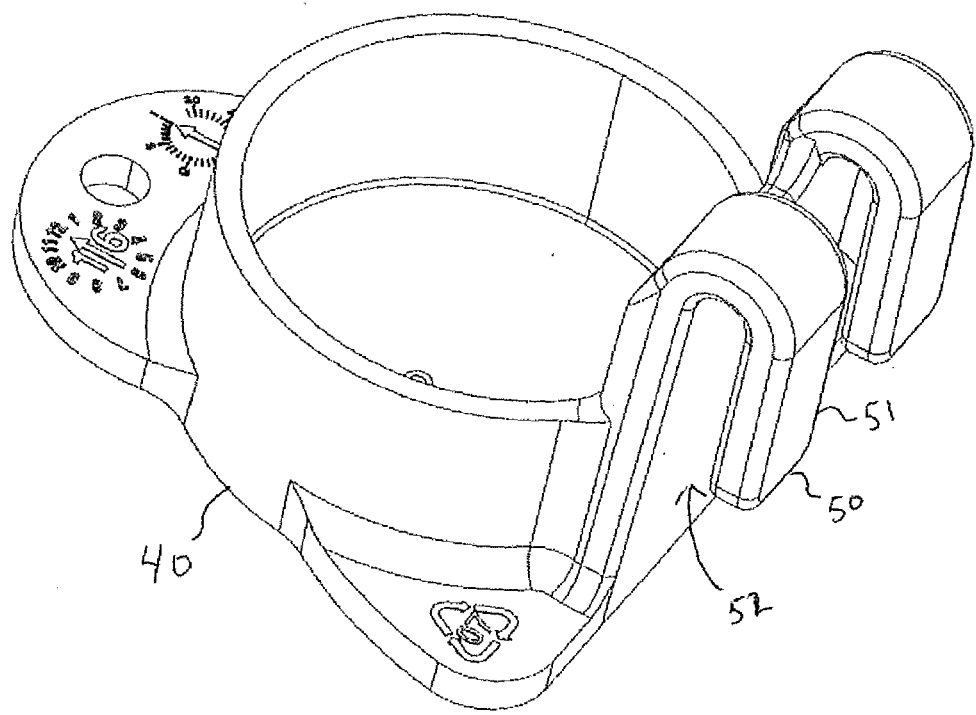
FIG. 4 is a perspective view of a bottom cap of the platform leg.
Figure 5:
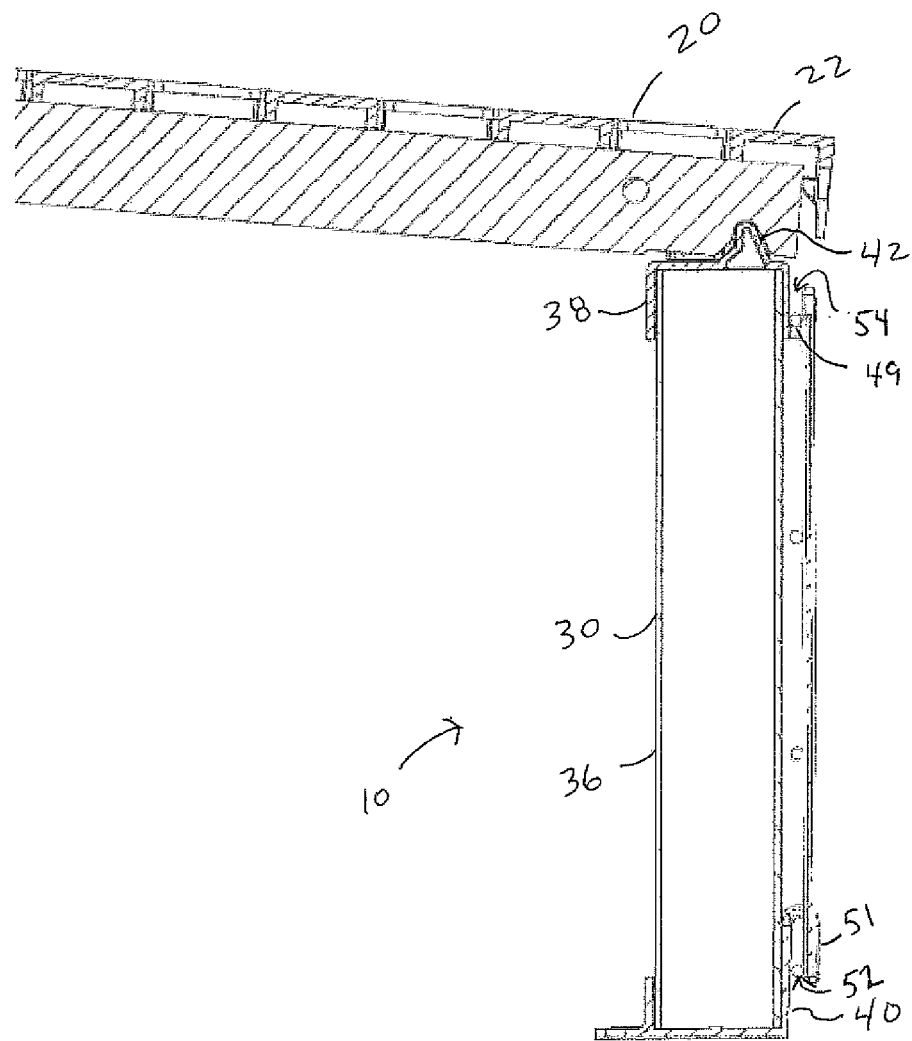
FIG. 5 is a sectional view of a portion of the platform and platform leg taken on line 5-5 of FIG. 2.

The nest house 12 is raised above the surface of the surrounding ground or substrate G and has sidewalls 18 with openings 19 that provide access for the birds to a platform 20 adjacent the nest house 12. An upper surface 22 of the raised platform 20 is formed with a grate member 24 with intersecting bars 26 so as to form apertures through which droppings may pass as best seen in FIG. 2.

At least a portion of a perimeter of the raised platform 20 comprises a wire mesh 28 covering the space between the ground surface G and the upper surface 22 of the platform 20 to prevent birds from gaining access to the area underneath the raised platform 20 and nest house 12. Preferably, the wire mesh 28 is formed with mesh strands 29 forming mesh openings in the wire mesh 28 to permit airflow underneath the raised platform 20 and nest house 12 to provide desirable ventilation. The wire mesh 28 in the illustrated embodiment comprises a grid of orthogonal strands 29, however the wire mesh 28 may be formed with other shapes and sizes of mesh openings without departing from the scope of the invention.

According to the invention, at least a portion of the upper surface 22 of the platform 20 is supported by platform floor supports 30 positioned at various positions on the perimeter of the platform 20. In the illustrated embodiment, platform floor supports 30 are positioned on a distil side 32 of the platform 20 away from the nest house 12 and other supports are used to support the nest house 12 and proximal side 34 of the platform 20. However, one skilled in the art will understand that platform floor supports 30 may be used around only a portion or the entire perimeter of the platform 20.

Each platform floor support 30 is formed with a bracing member 36 having an upper cap 38 and a lower cap 40. In the illustrated embodiment, the bracing member 36 is tubular in shape and desirably made of suitable PVC piping material. However, one will understand that other shapes and materials may be used for the bracing member 36 using sound engineering judgment.

In one embodiment, the upper cap 38 is received on an upper end of the bracing member 36 by frictional fit with the upper end. However, the upper cap 38 may be glued or fastened to the bracing member 36 using any known method. Additionally, the upper cap 38 may be molded as an integral component of the bracing member 36. Similarly, the lower cap 40 is received on a lower end of the bracing member 36 by frictional fit with the lower end. However, the lower cap 40 may be glued or fastened to the bracing member 36 using any known method. Additionally, the lower cap 40 may be molded as an integral component of the bracing member 36.

The upper cap 38 has an attachment mechanism 42 on an upper portion thereof configured to interact with the grate member 24 of the upper surface 22 to lock the platform floor support 30 to the upper surface 22 of the platform 20 such that the platform floor support 30 supports the upper surface 22 in its raised position above the ground G. One skilled in the art will recognize that the height of the raised platform 20 is determined by the length of the bracing member 36, and one can select the height of the raised platform 20 by selecting a bracing member 36 having the desired length.

The upper cap 38 has an upper catch 48 configured to interact with the wire mesh 28 and hold the wire mesh 28 in place. The upper catch 48 forms an upward-facing valley 49 for receiving a horizontal upper strand 29A at or near an upper portion of the wire mesh 28. The lower cap 40 has a lower catch 50 configured to interact with the wire mesh 28 and hold the wire mesh in place. The lower catch forms a downward-facing arch 51 for receiving a horizontal lower strand 29B at or near a lower portion of the wire mesh 28. A length of a travel space 52 under the downward-facing arch 51 of the lower catch 50 is greater that a length of a travel space 54 in the upward-facing valley 49 of the upper catch 48. The wire mesh 28 is configured to be attached to the platform floor support 30 by inserting the lower strand 29B into the travel space 52 under the downward-facing arch 51 of the lower catch 50. The wire mesh 28 is then lifted up so that the upper strand 29A is inserted into the travel space 54 in the upward-facing valley 49 of the upper catch 48. The travel space 52 under the downward-facing arch 51 of the lower catch 50 is sufficient that upper strand 29A is able to clear the upper catch 48 and be lowered into the upward-facing valley 49. As the wire mesh 28 is lowered to rest on the upper catch 48 at the bottom of the upward-facing valley 49, the lower strand 29B is still retained by the lower catch 50 because the travel space 52 under the downward-facing arch 51 of the lower catch 50 is greater than that of the travel space 54 of the upward-facing valley 49.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A poultry nesting system having a nest house with an adjacent platform raised above the surface of the surrounding substrate, the platform having an upper surface and at least a portion of a perimeter of the platform comprises a wire mesh covering a space between the substrate and the upper surface, the wire mesh being formed by a plurality of strands including an upper strand and a lower strand, wherein at least a portion of the upper surface of the platform is supported by a plurality of platform floor supports positioned on a perimeter of the platform, each of the plurality of platform floor supports comprising:

a bracing member;

an upper cap on an upper end of the bracing member, wherein the upper cap has an attachment mechanism on an upper portion thereof configured to interact with the upper surface to lock the platform floor support to the upper surface of the platform such that the platform floor support supports the upper surface in the raised position above the substrate, and wherein the upper cap has an upper catch configured to interact with the wire mesh and hold the wire mesh in place, wherein the upper catch forms an upward-facing valley for receiving the upper strand; and a lower cap on a lower end of the bracing member, wherein the lower cap has a lower catch configured to interact with the wire mesh and hold the wire mesh in place, wherein the lower catch forms a downward-facing arch for receiving the lower strand;

wherein a length of a travel space under the downward-facing arch of the lower catch is greater than a length of a travel space in the upward-facing valley of the upper catch.

2. The nesting system of claim 1 wherein the wire mesh comprises a grid of orthogonal strands.

3. The nesting system of claim 1 wherein the bracing member is tubular in shape and made of PVC piping material.

4. The nesting system of claim 1 wherein the upper cap is received on an upper end of the bracing member by frictional fit with the upper end and the lower cap is received on a lower end of the bracing member by frictional fit with the lower end.

* * * * *